Oct. 18, 1966  P. A. JOHNSON  3,279,575
MONEY HANDLING DEVICES
Filed Jan. 13, 1965
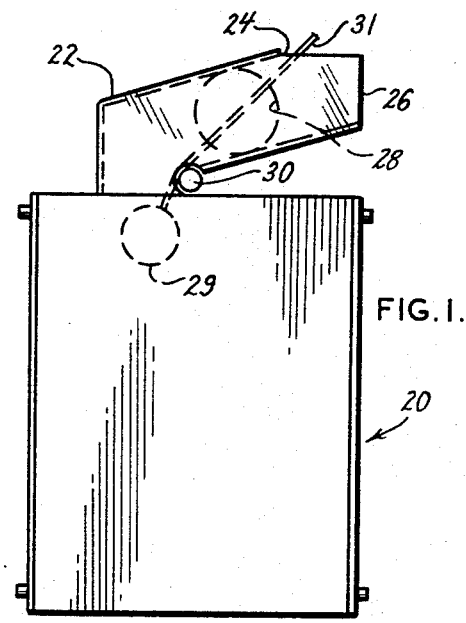
FIG. 1.
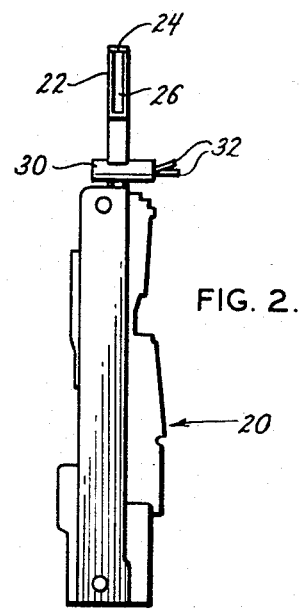
FIG. 2.
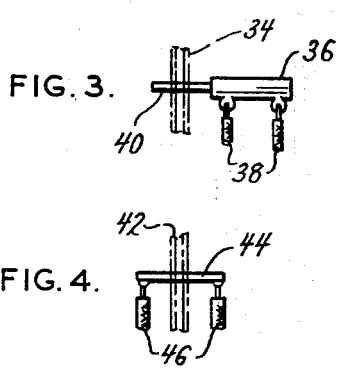
FIG. 3.
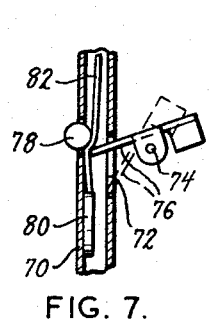
FIG. 4.
FIG. 7.
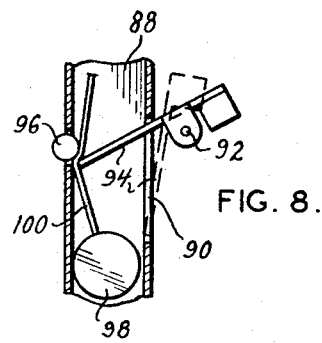
FIG. 8.
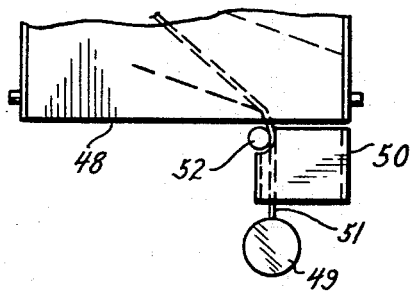
FIG. 5.
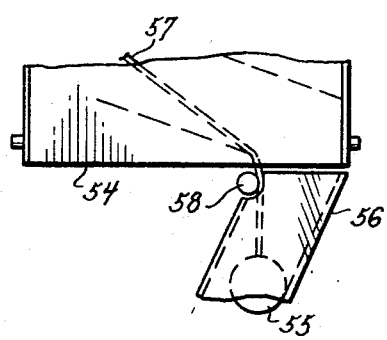
FIG. 6.

United States Patent Office 3,279,575
Patented Oct. 18, 1966

3,279,575
MONEY HANDLING DEVICES
Philip A. Johnson, Olivette, Mo., assignor to National Rejectors, Inc., St. Louis, Mo., a corporation of Missouri
Filed Jan. 13, 1965, Ser. No. 425,152
10 Claims. (Cl. 194—97)

This invention relates to improvement in money- handling devices. More particularly, this invention relates to improvements in anti-cheat components for money-handling devices.

It is, therefore, an object of the present invention to provide an improved anti-cheat component for a money-handling device.

Most patrons who introduce money into money-handling devices do so in a proper manner; but some patrons have been known to introduce money into such devices and then try to use that money to initiate extra operations of those devices. In some cases, patrons have attached slender strings or threads to money and have permitted that money to pass far enough through the money-handling devices to actuate the coin switches associated with those devices, and have then halted further movement of that money. Thereafter, those patrons have tried to use those strings or threads to recurrently raise and lower the money to cause that money to recurrently actuate the coin switches of those devices, and thereby initiate extra operations of those devices. Sharp-edged cutting elements have been provided in some money-handling devices to try to cut and sever any slender strings or threads which a patron might attach to money and then use to try to initiate extra operations of money-handling devices; but those sharp-edged cutting elements have not been very effective in cutting and severing some types of slender strings or threads. For example, those sharp-edged cutting elements have not been very effective in cutting and severing monofilament fishing lines and fishing leaders in those instances where those fishing lines and leaders have been attached to money and have been used to try to initiate extra operations of money-handling devices. It would be desirable to provide an anti-cheat component for money-handling devices which could effectively prevent the intiation of extra operations of those money-handling devices by money attached to monofilament fishing lines or leaders. The present invention provides such an anti-cheat component for money-handling devices; and it is, therefore, an object of the present invention to provide an anti-cheat component for a money-handling device which prevents the initiation of extra operations of that money-handling device by money attached to a monofilament fishing line or leader.

The anti-cheat component provided by the present invention is a heat source which is located immediately adjacent the path through which money must pass as it moves through the money-handling device; and that anti-cheat component can be located adjacent a point in that path where the money must change direction. The anti-cheat component does not obstruct the path through which the money passes, and hence the money will easily and freely pass beyond that anti-cheat component. However the anti-cheat component is located adjacent a point in the path where the money must change direction, any slender thread or string attached to the money will tend to move into engagement with that anti-cheat component; and any tensioning of that slender string or thread will force part of that slender string or thread to move into engagement with the anti-cheat component. The temperature of that anti-cheat component will be quite high; and, in the preferred embodiment of the present invention, the temperature of that anti-cheat component will be so high that a monofilament fishing line or leader will melt and sever as soon as it engages the surface of that anti-cheat component. As a matter of fact, the temperature of the anti-cheat component is, in the said preferred embodiment of the present invention, high enough to promptly char and sever any slender string or thread which is made from natural or synthetic fibers, as soon as that slender string or thread engages the surface of that anti-cheat component. As a result, the anti-cheat component provided by the present invention will effectively sever any slender string or thread which a patron may attach to money before introducing that money into the money-handling device. It is, therefore, an object of the present invention to provide an anti-cheat component in the form of a heat source which is located immediately adjacent the path which money must follow in moving through the money-handling device, which can be located adjacent a point in that path where the money must change direction, and which is hot enough to promptly sever any slender string or thread that engages its surface.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

In the drawing, FIG. 1 is a schematic, elevational view of a money-handling device and of an anti-cheat component therefor, FIG. 2 is a schematic, right-hand view of the money-handling device and anti-cheat component of FIG. 1, FIG. 3 is an elevational view of an alternate form of anti-cheat component provided by the present invention, FIG. 4 is an elevational view of another alternate form of anti-cheat component provided by the present invention, FIG. 5 is a broken, schematic, elevational view of another money-handling device and anti-cheat component, FIG. 6 is a broken, schematic, elevational view of still another money-handling device and anti-cheat component, FIG. 7 is a broken, schematic, sectional view of a further money-handling device and anti-cheat component, and FIG. 8 is a broken, schematic, sectional view of a still further money-handling device and anti-cheat component.

Referring to the drawing in detail, the numeral 20 generally denotes a money-handling device of the type that is usually known as a slug rejector. That slug rejector can be of standard and usual construction, and it can accommodate coins of just one denomination or it can accommodate coins of two or more denominations. The numeral 22 denotes the coin entry chute for the slug rejector 20; and that coin entry chute can have a cut-away portion that forms a coin-admitting opening 24 adjacent the top thereof, can have a cut-away portion that forms a coin-admitting opening 26 adjacent the right-hand end thereof, and can have a circular inlet opening 28 in the rear face thereof. If desired, one or two of the openings 24, 26 and 28 could be deleted. The slug rejector 20 and the coin entry chute 22 therefor are not, per se, parts of the present invention; and they are primarily shown to illustrate one environment in which the anti-cheat component of the present invention can be used. Many different forms of slug rejectors could be used, and many different forms of coin entry chutes could be used, as desired.

The numeral 30 denotes one form of anti-cheat component which is made in accordance with the principles and teachings of the present invention; and that anti-cheat component is a heat source that is mounted immediately adjacent the path through which a coin must move as it passes through the slug rejector 20. As indicated particularly by FIG. 1, that anti-cheat component is located adjacent a point in that path where inserted coins must change direction—those coins moving downwardly from upper right to lower left in the coin entry chute 22 at a shallow angle as they approach that anticheat component, and then dropping vertically downwardly as they pass beyond that anti-cheat component. As a result, the anti-cheat component 30 does not obstruct the path of coins introduced into the slug rejector 20, but will be engaged by any slender string or thread which is attached to a coin—as that slender string or thread is tensioned by the weight of that coin or by any backward pull applied by the patron who inserted that coin. That anti-cheat component is connected to a suitable source of power by conductors 32, and it will be heated to a temperature in the range of five hundred to six hundred degrees centigrade. Any temperature in that temperature range will be high enough to effect prompt melting and severing of any monofilament fishing line or leader which engages the surface of the anti-cheat component 30. Further, any temperature in that temperature range will be high enough to promptly char and sever any slender string or thread which is made from natural fibers, such as cotton, wool, linen or silk or which is made from synthetic fibers such as rayon or nylon. The overall result is that as a coin 29 moves downwardly out of the coin entry chute 22 and pulls the attached, slender string or thread 31 into engagement with the surface of the anti-cheat component 30, that anti-cheat component will promptly heat that slender string or thread and melt or char it, thereby severing that slender string or thread to keep the patron from manipulating the coin 29.

If the patron provides enough slack in the slender string or thread 31, and if the weight of the coin 29 is sufficiently small, or if that coin is diverted to the left by the coin-testing mechanisms of the slug rejector 20, the slender string or thread 31 may not immediately receive enough heat from the anti-cheat component 30 to be melted or charred. However, if the patron subsequently tries to arrest the movement of the coin 29 through the slug rejector, he will pull the slender string or thread 31 into intimate engagement with the surface of the anti-cheat component 30; and, thereupon, the heat from that anti-cheat component will promptly melt or char that slender string or thread. As a result, the patron will be unable to use that slender string or thread 31 to initiate extra operation of any device controlled by the slug rejector 20.

The anti-cheat component 30 is shown as a metal-encased electric heating element. Many different forms of metal-encased heating elements could be used; but the metal-encased heating elements used in electric soldering irons have been found to be very effective. Such heating elements are longlived, substantially trouble-free and inexpensive.

If desired, an anti-cheat component such as that shown in FIG. 3 could be used. That anti-cheat component is mounted adjacent a passageway 34 of a money-handling device, and it has a metal rod 40 extending transversely of that passageway. That metal rod will not obstruct the path of coins moving through the passageway 34, but it is located immediately adjacent that path. Moreover, that anti-cheat component is located adjacent a point in that path where the coins must change direction. The right-hand of the metal rod 40 extends into a tubular member 36, and that member can be a ceramic-encased helix of resistance wire. The terminals of the ceramic-encased resistance wire 36 will be connected to a suitable source of power by conductors 38; and the current flowing through that ceramic-encased resistance wire will heat that resistance wire and the metal rod 40 to such a high temperature that rod 40 will promptly melt or char any slender thread or string which comes into engagement with it.

If desired, a bare conductor could be used as the anti-cheat component of the present invention. Thus, in FIG. 4, a bare resistance wire 44 is mounted transversely of a passageway 42 of a money-handling device. The ends of that resistance wire are connected to a source of power by conductors 46; and the current flowing through that resistance wire will raise the temperature of that resistance wire to a level at which slender strings or threads that engage that resistance wire will promptly melt or char.

If desired, the anti-cheat component of the present invention could be disposed adjacent the outlet of a slug rejector. Thus, in FIG. 5, an anti-cheat component 52 is disposed adjacent the coin outlet 50 of a slug rejector 48. That anti-cheat component will not obstruct the path of coins moving downwardly from the slug rejector 48 into the coin outlet 50, but it will be engaged by any slender string or thread attached to a coin. For example, when a coin 49 moves downwardly from upper left to lower right, in the dotted-line passageway in the slug rejector 48, and then turns and falls downwardly through the coin outlet 50, that coin will pass by the anti-cheat component 52 without having its movement obstructed by that anti-cheat component. However, as that coin falls downwardly below the lower edge of the coin outlet 50, it will pull the slender string or thread 51 into engagement with the anti-cheat component 52, and that anti-cheat component will promptly melt or char that slender string or thread. The anti-cheat component 52 can be similar to any of the anti-cheat components of FIGS. 1–4.

The coin outlet, like the coin entry chute, of the slug rejector can be made with different configurations. Thus, as shown by FIG. 6, the coin outlet 56 is made so it inclines downwardly and to the left from the exit opening of the slug rejector 54. An anti-cheat component 58 is mounted adjacent the coin outlet 56, and it is located so it will not obstruct the path of coins, such as the coin 55, passing through that coin outlet. This means that as a coin moves downwardly from upper left to lower right in the dotted-line passageway in the slug rejector 54 and then turns to fall downwardly through the coin outlet 56, it will not be obstructed by the anti-cheat component 58. However, as the coin 55 moves downwardly in the coin outlet 56, it will pull the slender string or thread 57 into engagement with the surface of the anti-cheat component 58. That surface will be at a temperature which is high enoupgh to provide prompt melting or charring of the slender string or thread 57, and it will thereby assure prompt severing of that slender string or thread. The anti-cheat component 58 can be similar to any of the anti-cheat components of FIGS. 1–4.

If desired, the anti-cheat component that is used in a slug rejector can be spaced away from those portions of the coin passageway of that slug rejector which require the inserted coins to change direction. Thus, in FIG. 7, anti-cheat component 78 is disposed adjacent a portion of the passageway 70 where a coin 80 can fall vertically downwardly. The weight of that coin will tend to hold a slender string or thread 82, attached to that coin, away from the anti-cheat component 78; but that slender string or thread will be forced into engagement with the surface of that anti-cheat component by a weighted lever 76 which is rotatably mounted on a pivot 74 adjacent the passageway 70. An opening 72 is provided in that wall of the passageway 70 which is adjacent the pivot 74; and that opening is large enough to accommodate the free end of the weighted lever 76. The free end of the weighted lever 76 is wide enough to be coextensive with all possible positions of the slender string or thread 82, and the anti-cheat component 78 is long enough to be coextensive with all possible positions of that slender string or thread. As a result, whenever a slender string or thread extends downwardly in the passageway 70 from a point above the level of the anti-cheat component 78 to a point beyond the free end of the weighted lever 76, a portion of that slender string or thread will be interposed between the surface of the anti-cheat component 78 and the free end of that weighted lever. Furthermore, the weight on that weighted lever will cause that weighted lever to urge that slender string or thread into engagement with the surface of that anti-cheat component.

The mass of the weight for the weighted lever 76 is small enough so a coin 80 which strikes the free end of that weighted lever can easily cause that weighted lever to rotate in the counter-clockwise direction to the dotted-line position shown by FIG. 7. As a result, a coin 80 striking the free end of the weighted lever 76 will easily and quickly move the free end of that weighted lever out of its path, and will then move downwardly beyond that free end. However, as soon as the coin 80 moves downwardly beyond the free end of the weighted lever 76, that weighted lever will tend to return to the solid-line position shown in FIG. 7; and, as that weighted lever does so, it will force a portion of the slender string or thread 82 into engagement with the surface of the anti-cheat component 78. Thereupon, that portion of that slender string or thread will promptly melt or char and thus be severed.

The anti-cheat component 78 will not obstruct the path of coins in the passageway 70, but it is in communication with that passageway. As a result, any slender string or thread attached to a coin passing through that passageway can be forced into engagement with the surface of that anti-cheat component by the free end of the weighted lever 76. Yet, that anti-cheat component will not interfere with the ready and free movement of coins downwardly through the passageway 70. The anti-cheat component 78 is cylindrical in configuration; and hence if a coin happened to engage the surface of that anti-cheat component, that coin would easily glance off of, and away from, that anti-cheat component. This means that any coin passing downwardly through the passageway 70 will not be obstructed or materially impeded by the anti-cheat component 78.

The weighted lever 76 in FIG. 7 rotates through a path which is perpendicular to the face of any coin passing through that passageway. If desired, a weighted lever could be mounted so it would rotate through a path that was parallel to the plane of any coin passing through that passageway. Thus, in FIG. 8, a weighted lever 94 is rotatably mounted on a pivot 92; and that weighted lever rotates through a path which is parallel to the plane of a coin 98 moving through passageway 88. That passageway has an opening 90 in that side thereof which is adjacent the pivot 92; and that opening is long enough and wide enough to accommodate the free end of the weighted lever 94. An anti-cheat component 96 is mounted adjacent the opposite side of the passageway 88; and the weight on the weighted lever 94 urges the free end of that lever toward that anti-cheat component. The mass of the weight on the weighted lever 94 is small enough so any coin which is introduced into the passageway 88 will be able to rotate that weighted lever to the dotted-line position shown by FIG. 8 and then move beyond the free end of that weighted lever.

The free end of the weighted lever 94 is wide enough to be coextensive with all possible positions which a slender string or thread 100 could occupy when that slender string or thread is attached to a coin 98 and that coin moves downwardly below the level of the free end of that weighted lever. The anti-cheat component 96 also is long enough to be coextensive with all possible positions which the slender string or thread 100 could occupy when that slender string or thread is attached to a coin 98 and that coin moves downwardly beyond the free end of the weighted lever 94. As a result, whenever a slender string or thread extends downwardly in the passageway from a point above the level of the anti-cheat component 96 to a point beyond the free end of the weighted lever 94, that pivoted lever will force a portion of that slender string or thread into engagement with the surface of that anti-cheat component. That surface will be hot enough to cause that portion of that slender string or thread to melt or char and thus sever.

The anti-cheat component 96 is disposed so it will not obstruct the path of coins moving downwardly through the passageway 88, but it is in communication with that passageway. As a result, any slender string or thread attached to a coin passing through that passageway can be forced into engagement with the surface of that anti-cheat component by the free end of the weighted lever 94. Yet, that component will not interfere with the ready and free movement of coins downwardy through the passageway 88. The anti-cheat component 96 is cylindrical in configuration; and hence if a coin happened to engage the surface of that anti-cheat component, that coin would easily glance off of, and away from, that anti-cheat component. This means that any coin passing downwardly through the passageway 88 will not be obstructed or materially impeded by the anti-cheat component 96.

Most monofilament fishing lines or leaders will promptly melt when they engage a heat source that has a surface temperature in excess of three hundred degrees centigrade, and most slender strings or threads composed of natural or synthetic fibers will promptly char when they engage a heat source that has a surface temperature in excess of five hundred degrees centigrade. Consequently, where the anti-cheat components of the present invention are heated so the surfaces thereof have temperatures in the range of five hundred to six hundred degrees centigrade, those anti-cheat components will promptly sever any slender strings or threads that are attached to coins which are introduced into money-handling devices equipped with those anti-cheat components.

Whereas the drawing and accompanying description have disclosed several preferred embodiments of the present invention it should be apparent to those skilled in the art that various changes may be made in the form of the invention without affecting the scope thereof.

What I claim is:

1. In a money-handling device that has a passageway for coins, the improvement which comprises an anti-cheat component that is located out of said passageway so it will not obstruct the movement of coins through said passageway, said anti-cheat component being in communication with said passageway so a slender string or thread attached to a coin in said passageway can engage the surface thereof, said anti-cheat component being located adjacent a point in said passageway where coins must change direction so a slender string or thread attached to a coin will engage the surface of said anti-cheat component, said anti-cheat component normally having the surface thereof at a temperature in excess of five hundred degrees centigrade to enable said anti-cheat component to melt or char any slender string or thread which is attached to a coin moving through said passageway and which comes into engagement with it, whereby a patron can not use a slender string or thread to manipulate a coin introduced into said money-handling device, said anti-cheat component being a metal-encased resistance wire.

2. In a money-handling device that has a passageway for coins, the improvement which comprises an anti-cheat component that is located relative to said passageway so it will not obstruct the movement of coins through said passageway, said anti-cheat component being in communication with said passageway so a slender string or thread attached to a coin in said passageway can engage the surface thereof, said anti-cheat component being located adjacent a point in said passageway where coins must change direction so a slender string or thread attached to a coin will engage the surface of said anti-cheat component, said anti-cheat component normally having the surface thereof at a temperature in excess of five hundred degrees centigrade to enable said anti-cheat component to melt or char any slender string or thread which is attached to a coin moving through said passageway and which comes into engagement with it, whereby a patron can not use a slender string or thread to manipulate a coin introduced into said money handling device, said anti-cheat component being a bare resistance wire.

3. In a money-handling device that has a passageway for coins, the improvement which comprises an anti-cheat component that is located relative to said passageway so it will not obstruct the movement of coins through said passageway, said anti-cheat component being in communication with said passageway so a slender string or thread attached to a coin in said passageway can engage the surface thereof, said anti-cheat component being located adjacent a point in said passageway where coins must change direction so a slender string or thread attached to a coin will engage the surface of said anti-cheat component, said anti-cheat component normally having the surface thereof at a temperature in excess of five hundred degrees centigrade to enable said anti-cheat component to melt or char any slender string or thread which is attached to a coin moving through said passageway and which comes into engagement with it, whereby a patron can not use a slender string or thread to manipulate a coin introduced into said money-handling device, said anti-cheat component being a metal rod which has one end thereof adjacent said passageway and which has the other end thereof extending into a tubular heating element.

4. In a money-handling device that has an inlet, an outlet, and a passageway for coins, the improvement which comprises an anti-cheat component that is located relative to said passageway so it will not obstruct the movement of coins through said passageway and so it will permit coins to move past it, said anti-cheat component being in communication with said passageway so a slender string or thread attached to a coin which is in said passageway and which has moved past said anti-cheat component can engage the surface thereof, said anti-cheat component normally having the surface thereof at a temperature which will enable said anti-cheat component to heat-sever any slender string or thread which is attached to a coin moving through said passageway and which comes into engagement with it even though said slender string or thread is moved relative to said anti-cheat component, whereby a patron can not use a slender string or thread to manipulate a coin introduced into said money-handling device, said anti-cheat component being disposed adjacent said inlet of said money-handling device.

5. In a money-handling device that has an inlet, an outlet, and a passageway for coins, the improvement which comprises an anti-cheat component that is located relative to said passageway so it will not obstruct the movement of coins through said passageway and so it will permit coins to move past it, said anti-cheat component being in communication with said passageway so a slender string or thread attached to a coin which is in said passageway and which has moved past said anti-cheat component can engage the surface thereof, said anti-cheat component normally having the surface thereof at a temperature which will enable said anti-cheat component to heat-sever any slender string or thread which is attached to a coin moving through said passageway and which comes into engagement with it even though said slender string or thread is moved relative to said anti-cheat component, whereby a patron can not use a slender string or thread to manipulate a coin introduced into said money-handling device, said anti-cheat component being disposed adjacent said outlet of said money-handling device.

6. In a money-handling device that has an inlet, an outlet, and a passageway for coins, the improvement which comprises an anti-cheat component that is located relative to said passageway so it will not obstruct the movement of coins through said passageway and so it will permit coins to move past it, said anti-cheat component being in communication with said passageway so a slender string or thread attached to a coin which is in said passageway and which has moved past said anti-cheat component can engage the surface thereof, said anti-cheat component normally having the surface thereof at a temperature which will enable said anti-cheat component to heat-sever any slender string or thread which is attached to a coin moving through said passageway and which comes into engagement with it even through said slender string or thread is moved relative to said anti-cheat component, whereby a patron can not use a slender string or thread to manipulate a coin introduced into said money-handling device.

7. In a money-handling device that has an inlet, an outlet, and a passageway for coins, the improvement which comprises an anti-cheat component that is located relative to said passageway so it will not obstruct the movement of coins through said passageway, said anti-cheat component being in communication with said passageway so a slender string or thread attached to a coin in said passageway can engage the surface thereof, said anti-cheat component being cylindrical and having the upper portion thereof rounded to enable any coins which might engage said anti-cheat component to bounce away from said anti-cheat component, said anti-cheat component normally having the surface thereof at a temperature which will enable said anti-cheat component to heat-sever any slender string or thread which is attached to a coin moving through said passageway and which comes into engagement with it, whereby a patron can not use a slender string or thread to manipulate a coin introduced into said money-handling devices.

8. In a money-handling device that has an inlet, an outlet, and a passageway for coins, the improvement which comprises an anti-cheat component that is located relative to said passageway so it will not obstruct the movement of coins through said passageway and so it will permit coins to move past it, said anti-cheat component being in communication with said passageway so a slender string or thread attached to a coin which is in said passageway and which has moved past said anti-cheat component can engage the surface thereof, and a biased member that normally lies in the path of coins moving through said passageway but that can respond to coins moving through said passageway to move and thereby permit said coins to pass through said passageway, said member thereafter responding to the bias thereon to move back toward its normal position and thereby urge any strings or threads attached to said coins into engagement with said anti-cheat component, said anti-cheat component being mounted adjacent one side of said passageway, said member being mounted adjacent the opposite side of said passageway, said anti-cheat component normally having the surface thereof at a temperature which will enable said anti-cheat component to heat-sever any slender string or thread which is attached to a coin moving through said passageway and which comes into engagement with it even though said slender string or thread is moved relative to said anti-cheat component, whereby a patron can not use a slender string or thread to manipulate a coin introduced into said money-handling device.

9. In a money-handling device that has an inlet, an outlet, and a passageway for coins, the improvement which comprises an anti-cheat component that is located relative to said passageway so it will not obstruct the movement of coins through said passageway and so it will permit coins to move past it, said anti-cheat component being in communication with said passageway so a slender string or thread attached to a coin which is in said passageway and which has moved past said anti-cheat component can engage the surface thereof, and a member that normally lies in the path of coins moving through said passageway but that can respond to coins moving through said passageway to move and thereby permit said coins to pass through said passageway, said member thereafter moving back toward its normal position to urge any strings or threads attached to said coins into engagement with said anti-cheat component, said anti-cheat component normally having the surface thereof at a temperature which will enable said anti-cheat component to heat-sever any slender string or thread which is attached to a coin moving through said passageway and which comes into engagement with it even though said slender string or thread is moved relative to said anti-cheat component, whereby a patron can not use a slender string or thread to manipulate a coin introduced into said money-handling device.

10. In a money-handling device that has an inlet, an outlet, and a passageway for coins, the improvement which comprises an anti-cheat component that is located relative to said passageway so it will not obstruct the movement of coins through said passageway and so it will permit coins to move past it, said anti-cheat component being in communication with said passageway so a slender string or thread attached to a coin which is in said passageway and which has moved past said anti-cheat component can engage the surface thereof, and means to urge any strings or threads attached to said coins into engagement with said anti-cheat component, said anti-cheat component normally having the surface thereof at a temperature which will enable said anti-cheat component to heat-sever any slender string or thread which is attached to a coin moving through said passageway and which comes into engagement with it even though said slender string or thread is moved relative to said anti-cheat component, whereby a patron can not use a slender string or thread to manipulate a coin introduced into said money-handling device.

References Cited by the Examiner
UNITED STATES PATENTS

| | | | |
|---|---|---|---|
| 1,095,418 | 5/1914 | Ravert | 194—97 |
| 3,010,556 | 11/1961 | Wawrzonek et al. | 194—2 |
| 3,050,609 | 8/1962 | Brackin et al. | 30—140 |
| 3,136,402 | 6/1964 | Smith | 194—4 |
| 3,168,947 | 2/1965 | Greenwald | 194—97 X |

ROBERT B. REEVES, *Primary Examiner.*

STANLEY H. TOLLBERG, *Examiner.*